Figure 1:
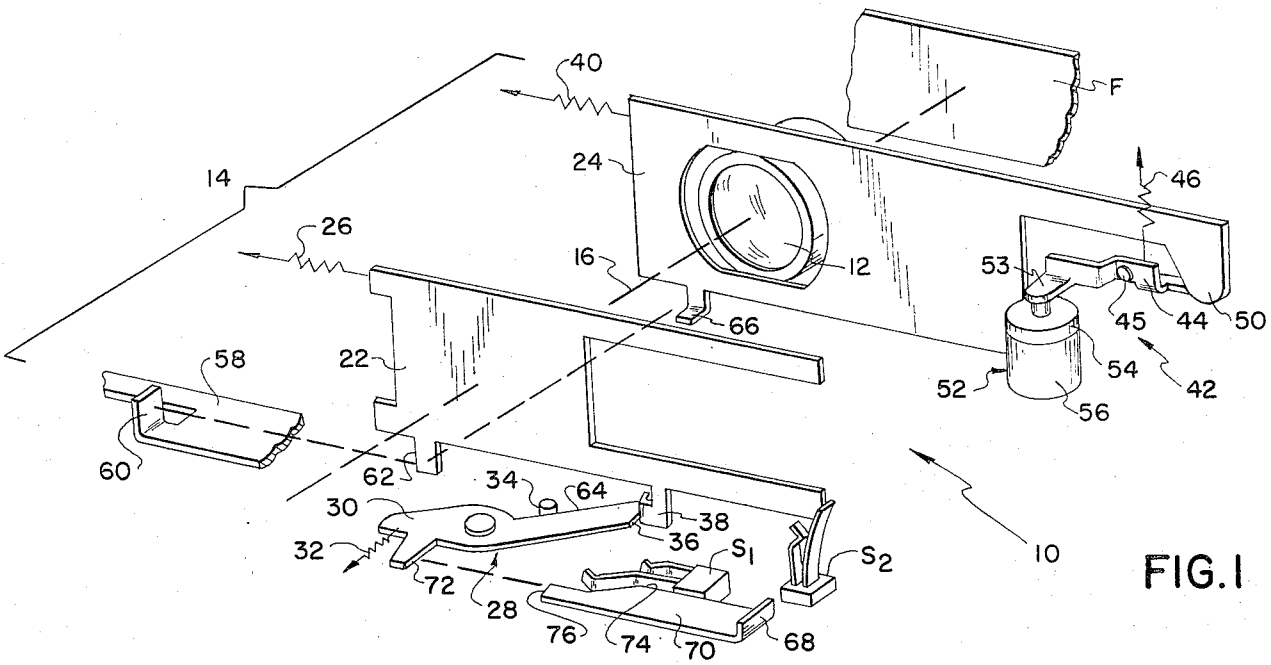
Figure 2:
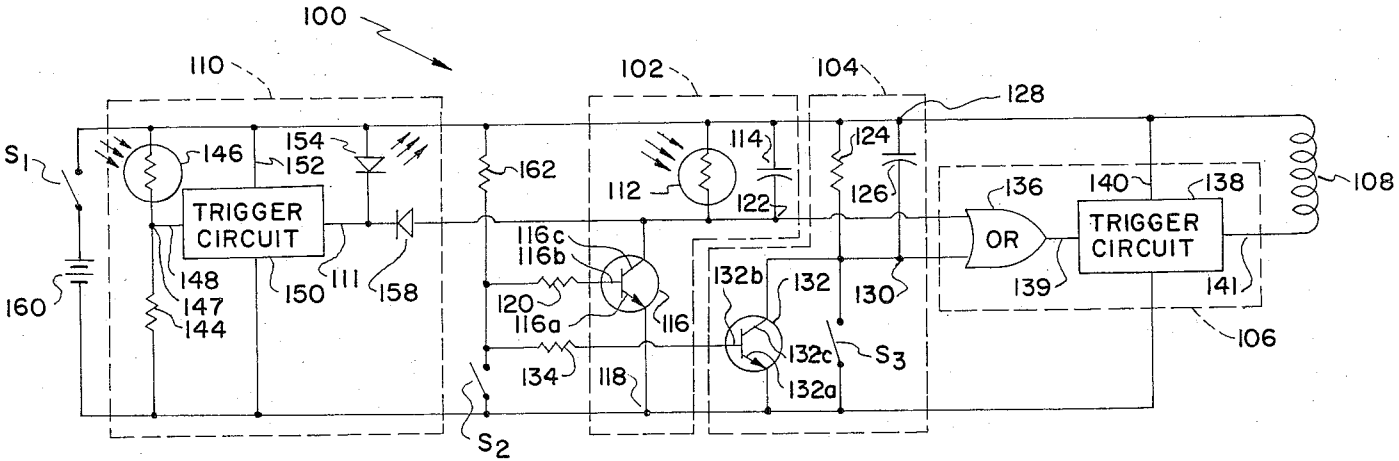

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 7, 1974

922 O.G. 11

T922,009
SHUTTER CONTROL CIRCUIT FOR A PHOTOGRAPHIC CAMERA

Robert V. Alessi, 901 Elmgrove Road, Rochester, N.Y. 14650

Filed Oct. 24, 1973, Ser. No. 409,228
Int. Cl. G03b *7/08*
U.S. Cl. 354—31
1 Sheet Drawing. 17 Pages Specification

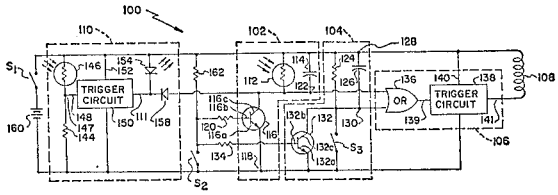

A photographic camera includes an electronic shutter control circuit for controlling a camera shutter mechanism to permit smear-free exposures. The shutter control circuit includes a timing device for closing the shutter, comprising a first timer responsive to prevailing scene light conditions and a second timer having a fixed predetermined time constant, the second timer being adapted to close the shutter after a fixed time interval to eliminate extended time exposures which occur under low scene light conditions. The shutter control circuit further includes a network for indicating the adequacy of scene light for obtaining a proper exposure within the fixed time interval. The network is coupled to the light responsive timer through a reversed biased diode to effectively render that timer incapable of controlling the shutter mechanism under low scene light conditions.

SHUTTER CONTROL CIRCUIT FOR A PHOTOGRAPHIC CAMERA

Filed Oct. 24, 1973